United States Patent [19]

Nagaoka et al.

[11] Patent Number: 4,517,859
[45] Date of Patent: May 21, 1985

[54] SHIFT UP CLUTCH CONTROL IN A MULTIPLE CLUTCH TYPE GEAR TRANSMISSION FOR AUTOMOBILE

[75] Inventors: Mitsuru Nagaoka; Mitsuo Yasuno, both of Hiroshima, Japan

[73] Assignee: Mazda Motor Corporation, Hiroshima, Japan

[21] Appl. No.: 454,564

[22] Filed: Dec. 30, 1982

[30] Foreign Application Priority Data

Jan. 5, 1982 [JP] Japan ..................... 57-760
Mar. 29, 1982 [JP] Japan ................... 57-50667

[51] Int. Cl.³ ................. B60K 41/18; B60K 41/16; F16H 5/52
[52] U.S. Cl. .................. 74/866; 74/336 R; 74/337; 74/869
[58] Field of Search ........... 74/866, 869, 868, 336 R, 74/337

[56] References Cited

U.S. PATENT DOCUMENTS

| 3,215,001 | 11/1965 | Zundel | 74/869 X |
| 3,719,108 | 3/1973 | Sakai | 74/869 |
| 3,733,932 | 5/1973 | Uozumi et al. | 74/869 |
| 3,747,439 | 7/1973 | Uozumi et al. | 74/869 |
| 3,782,216 | 1/1974 | Sakai | 74/869 X |
| 3,855,880 | 12/1974 | Ishimaru et al. | 74/866 X |
| 4,033,203 | 7/1977 | Hirosawa et al. | 74/869 |
| 4,140,031 | 2/1979 | Sibeud et al. | 74/336 R X |
| 4,324,156 | 4/1982 | Iwanaga et al. | 74/869 |
| 4,361,060 | 11/1982 | Smyth | 74/866 |
| 4,413,536 | 11/1983 | Whitney et al. | 74/868 X |
| 4,442,727 | 4/1984 | Young | 74/337 X |

FOREIGN PATENT DOCUMENTS 56-94050 7/1981 Japan .
2064028 6/1981 United Kingdom .

OTHER PUBLICATIONS

"Two Clutch Variations", by Jeffrey Daniels; AUTOCAR, w/e May 23, 1981; pp. 36-37.

Primary Examiner—George H. Krizmanich
Assistant Examiner—Dirk Wright
Attorney, Agent, or Firm—Fleit, Jacobson, Cohn & Price

[57] ABSTRACT

First and second clutch devices releasably and alternately connect respective transmission input shafts with an engine output shaft. The input shafts are connected through respective sets of transmission gears with a transmission output element. In a gear shift up operation, one of the clutch devices, which has not been in driving engagement, is brought into partial engagement with a first engaging speed for a first period of time, while the second clutch device remains in driving engagement, so that there is a certain period of time overlap wherein both clutch devices are in engagement simultaneously. After the second clutch device has been disengaged, the engagement speed of the first clutch device is decreased to a lower speed and then again increased to a higher speed.

12 Claims, 7 Drawing Figures

GEAR CONTROL SUB-FLOW (SHIFT UP)

GEAR CONROL SUB-FLOW (SHIFT DOWN)

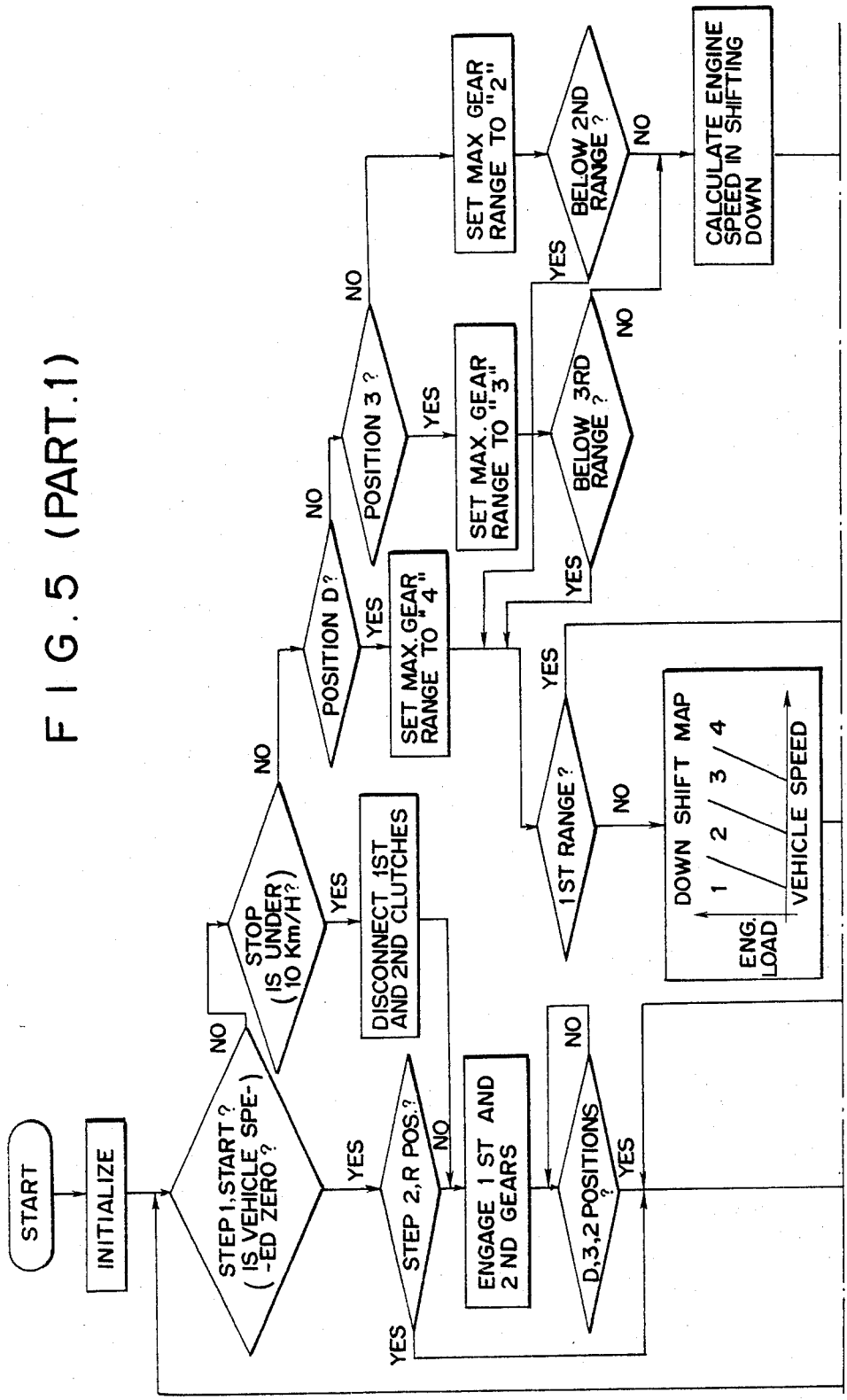
FIG. 5 (PART.1)

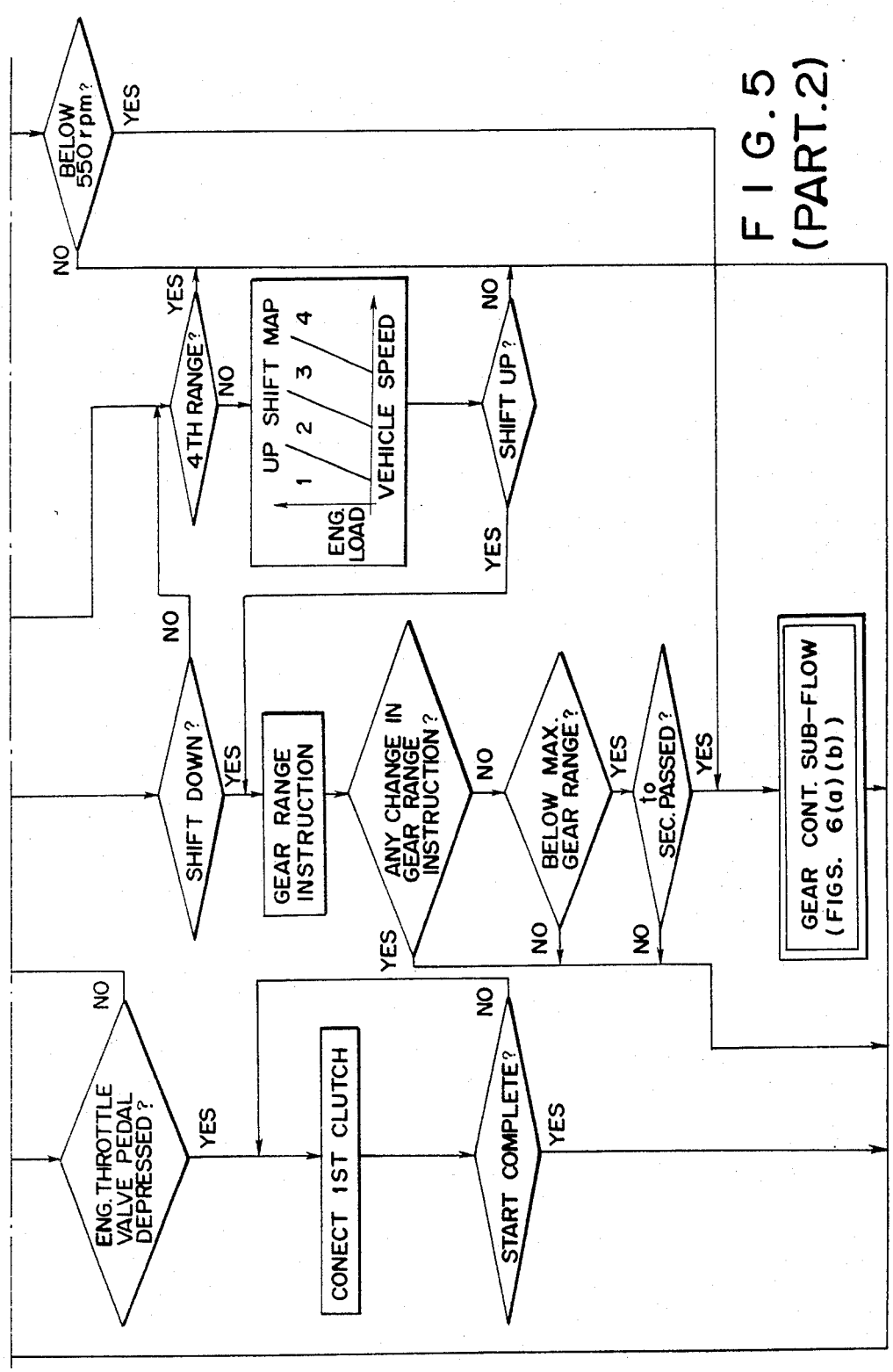
FIG.5 (PART.2)

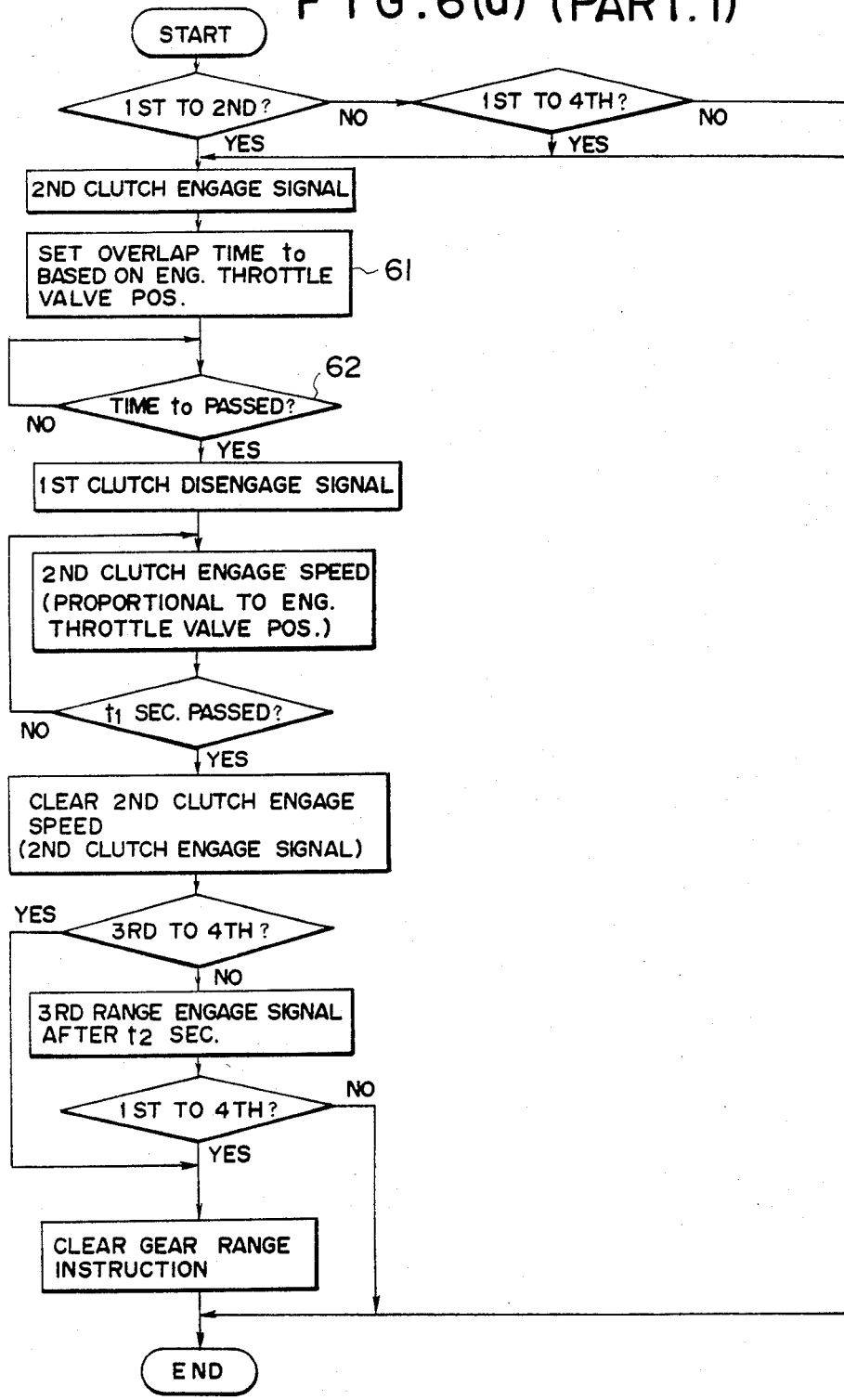
FIG.6(a) (PART.1)

FIG.6(a) (PART.2)
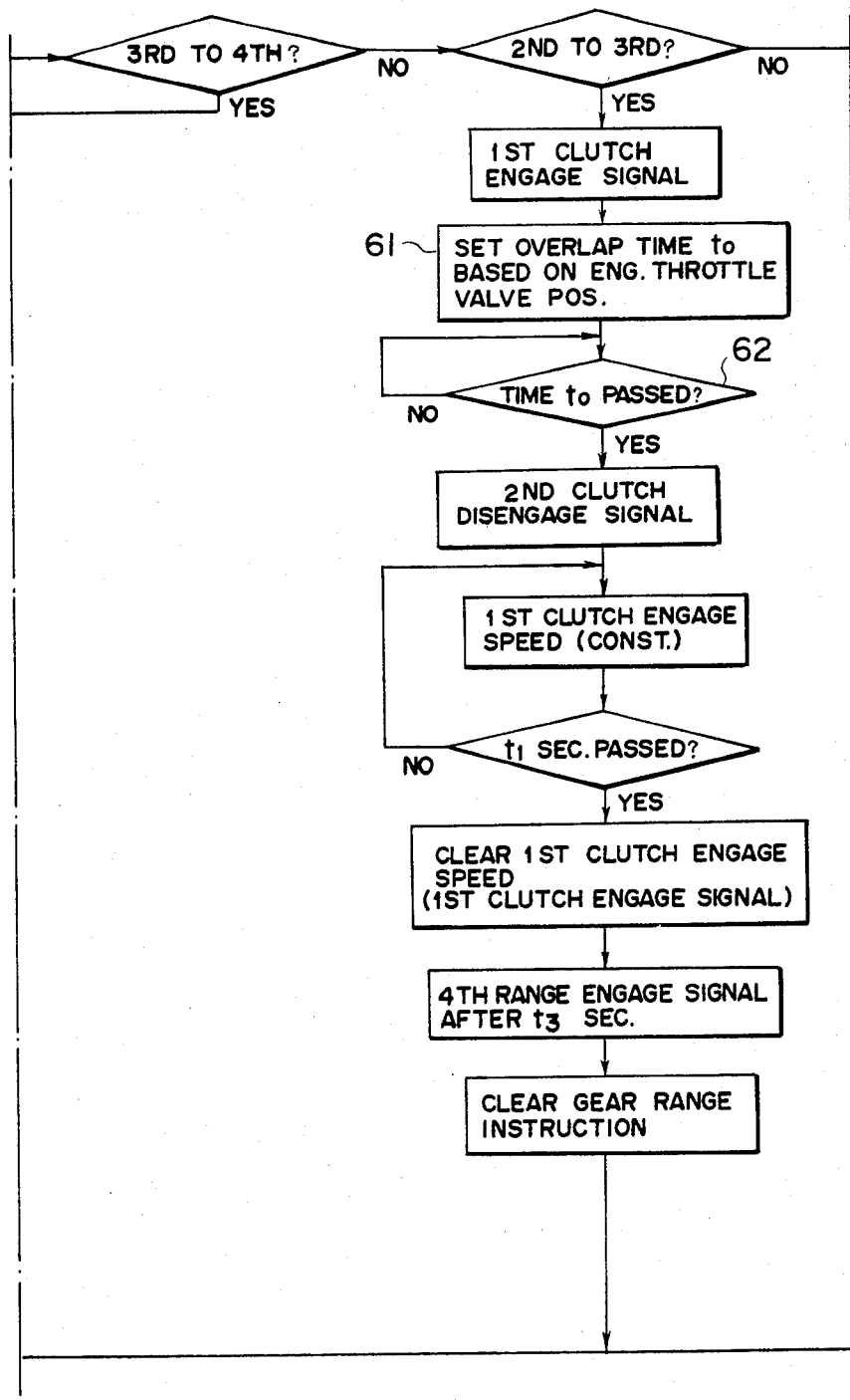

FIG. 6(b) (PART.1)
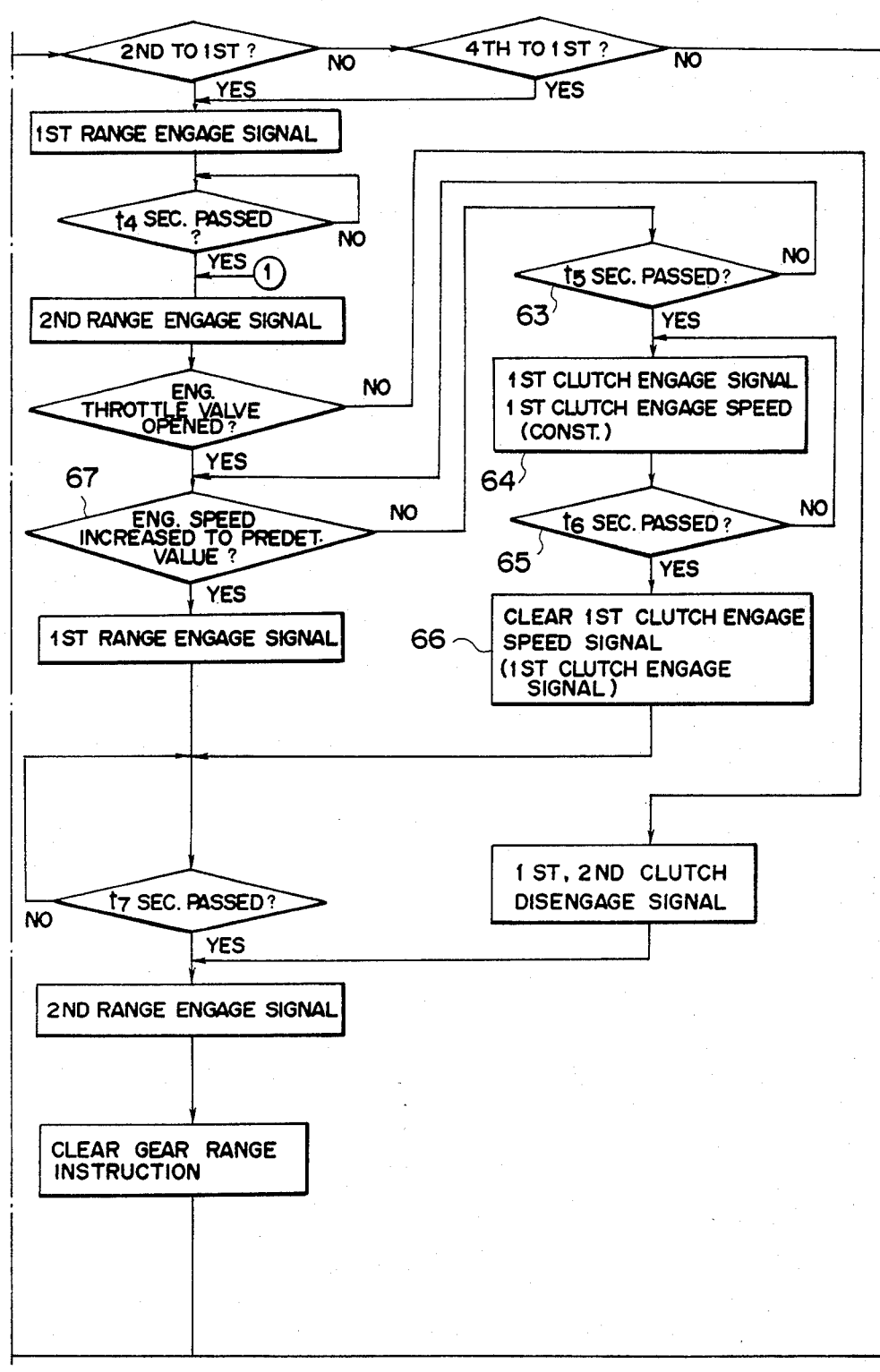

FIG.6(b) (PART.2)
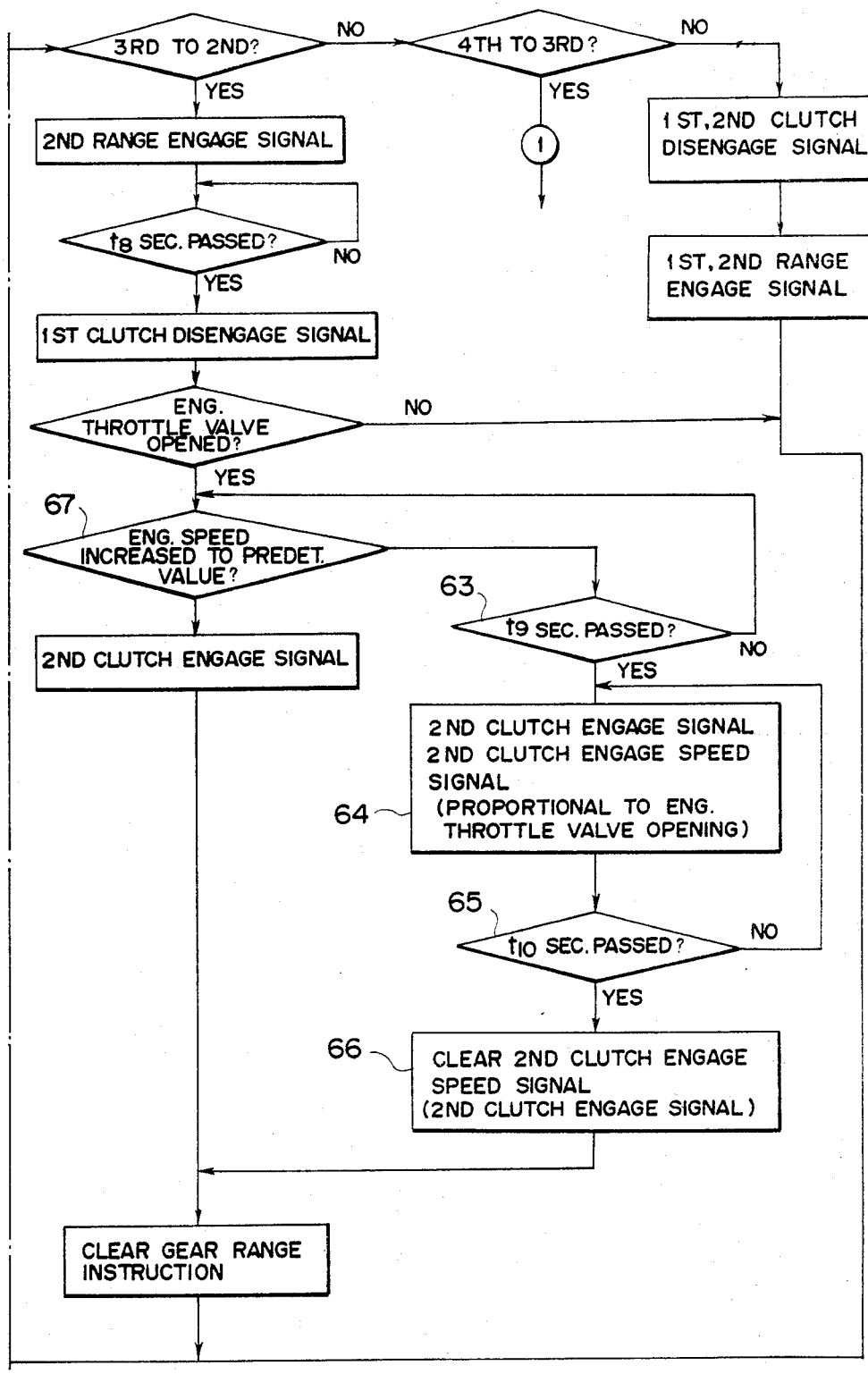

SHIFT UP CLUTCH CONTROL IN A MULTIPLE CLUTCH TYPE GEAR TRANSMISSION FOR AUTOMOBILE

The present invention relates to multiple-stage automobile power transmissions and more particularly to transmissions having a plurality of clutch devices. More specifically, the present invention pertains to clutch controls for such transmissions.

Among known multiple-stage gear transmissions for automobile use, the most widely used ones are of counter-shaft type which includes an input shaft which is adapted to be connected with the engine output shaft through a clutch mechanism and carries a plurality of gears which are arranged with meshing engagement respectively with gears on a counter-shaft extending in parallel with the input shaft so as to provide a plurality of gear trains. For the purpose of changing gear ratio in this type of gear transmissions, the operator is required at first to disengage the clutch so that the input shaft of the transmission is disconnected from the engine output shaft while simultaneously releasing the engine throttle valve control pedal to close the engine throttle valve. This procedure makes manual gear changing operation complicated and moreover due to this complicated gear changing operation this type of transmissions cannot be adopted in automatic transmissions.

There are known types of gear mechanisms which are suitable for use in automatic transmissions. This type of gear mechanisms include a plurality of gear trains comprised of intermeshing gears and associated with clutches and brakes for selecting one of such gear trains. Planetary gear mechanisms belong to this type and have been widely used in automatic transmissions. It should however be noted that planetary type gear mechanisms are disadvantageous in respect of weight and efficiency and hydraulic torque converters have to be used with such gear mechanisms when they are used in automatic transmissions.

Known counter-shaft type transmissions include such type in which it is not required to close the engine throttle valve each time when gear shifting is made. For example, the magazine "Auto Car" Mar. 29, 1980 issue and May 23, 1981 issue and Japanese patent disclosure 56-94050 corresponding to the British Pat. No. 2,064,028 disclose a transmission which includes two coaxially arranged input shafts adapted to be connected respectively through clutch mechanisms with an engine output shaft, one of the input shafts carrying first and third stage gears and the other carrying second and fourth stage gears. A counter-shaft is provided in parallel with the input shafts and carries counter gears which are always in meshing engagement with the gears on the input shafts. The inputs shafts are provided with connecting hubs which are adapted to connect selectively the gears on the input shafts to the input shafts on which such gears are mounted. When one of the input shafts is engaged with the engine output shaft and one of the gears thereon, for example, the first or third stage gear is drivingly connected thereto through the associated connecting hub, the other input shaft is disconnected from the engine output shaft and during this period of operation one of the gears, for example, the second or fourth gear on the shaft is connected with the same shaft. Thereafter, the aforementioned one input shaft is disconnected from the engine output shaft and at the same time the other input shaft is connected with the engine output shaft to complete a gear shifting operation. Theoretically, three or more input shafts may be provided with corresponding number of clutch mechanisms. The only requirement is that the gears on one input shaft shall not be of adjacent gear stages.

It is an object of the present invention to ensure a smooth gear shifting up operation in the aforementioned multiple clutch type gear transmissions.

Another object of the present invention is to provide clutch control means for such multiple clutch type gear transmissions, which is effective to eliminate or minimize gear shifting shock which may be encountered during gear shifting operations, particularly in shifting up operations.

According to the present invention, the above and other objects can be accomplished, in a multiple clutch type transmission including a plurality of input shafts, a plurality of clutch devices for releasably and alternately connecting respective ones of said input shafts with an engine output shaft, each of said input shafts being associated with at least one set of transmission gears for connecting the input shaft associated therewith to an output element of the transmission, means for controlling said clutch devices so that a selected one of said input shafts is connected through a selected one of said clutch devices with the engine output shaft and through a selected set of said transmission gears with the output element. The present invention therefore provides a method of controlling the clutch device in gear shift up operation, which comprises steps of bringing one of the clutch devices which has not been in engagement into engagement with a first engaging speed for a first period of time, then disconnecting the other clutch device which has been in engagement so that there is a certain period of overlap wherein the one clutch device is in a half-engaged condition while the other clutch device is still in engagement. In a preferable mode of the present invention, the engaging speed of said one clutch device is decreased to a second engaging speed which is lower than the first engaging speed for a second period of time, and thereafter the engaging speed is increased to to a third engaging speed which is higher than the second engaging speed. Thus, according to the present invention, the clutch device associated with the other input shaft is disconnected in a gear shifting up operation after the engine speed is decreased because one of the clutch devices is brought into a half-engaged condition while the other clutch device is still engaged so that it is possible to eliminate or at least decrease to a greater extent the shock which may otherwise be produced. The second engaging speed may be of a predetermined constant value but may preferably be increased in accordance with an increase in engine load. By controlling the third engaging speed in this manner, it becomes possible to get better synchronization of the transmission input shaft with the engine output shaft because the clutch engagement is rapidly made when the engine load is relatively high and therefore engine speed recovery is relatively rapidly made after disconnection of the other clutch device, whereas the clutch engagement is relatively slowly made under a relatively light load engine operation wherein the engine speed recovery is made relatively slowly.

In another aspect of the present invention, there is provided a multiple clutch type transmission including a plurality of input shafts, a plurality of clutch devices respectively associated with said input shafts for releasably connecting associated ones of the input shafts with an engine output shaft, each of said input shafts being associated with at least one set of transmission gears for connecting the associated input shaft with an output element of the transmission, clutch controlling means for producing a first clutch engaging signal in gear shift up operation for a first period of time to bring one of the clutch devices which has not been in engagement and is associated with one input shaft having the transmission gear set of one stage with a first engaging speed while the other clutch device is still in engagement so that two clutch devices are maintained simultaneously in at least half-engaged condition, and then producing a clutch disengaging signal to have the other clutch device disengaged. At the same time, a second clutch engaging signal may be produced to bring said one clutch device into engagement with a second engaging speed which is lower than the first engaging speed, and thereafter there may be produced a third clutch engaging signal after said other clutch device is disengaged to increase clutch engaging speed to a third engaging speed higher than the second engaging speed.

According to a further aspect of the present invention, there is provided a transmission including a first input shaft adapted to be releasably connected with an engine output shaft through a first clutch device, a first transmission gear set associated with said first input shaft for connecting said first input shaft with an output element of the transmission, a second input shaft adapted to be releasably connected with the engine output shaft through a second clutch device, a second transmission gear set which is of a lower stage than said first transmission gear set and associated with said second input shaft for connecting said second input shaft with the output element, controlling means for producing, in an operating condition wherein said second clutch device is in engagement, a first clutch engaging signal to bring said first clutch device into engagement with a first engaging speed so that the first clutch device is brought into a half-engaged condition while the second clutch device is still engaged, then producing a clutch disengaging signal for disengaging the second clutch device as well as a second clutch engaging signal to bring the first clutch device into engagement with a second engaging speed which is lower than the first engaging speed, and thereafter producing a third engaging signal for bringing the first clutch device into engagement with a third engaging speed which is higher than the second engaging speed.

The above and other objects and features of the present invention will become apparent from the following descriptions of a preferred embodiment taking reference to the accompanying drawings, in which.

Figure 1:
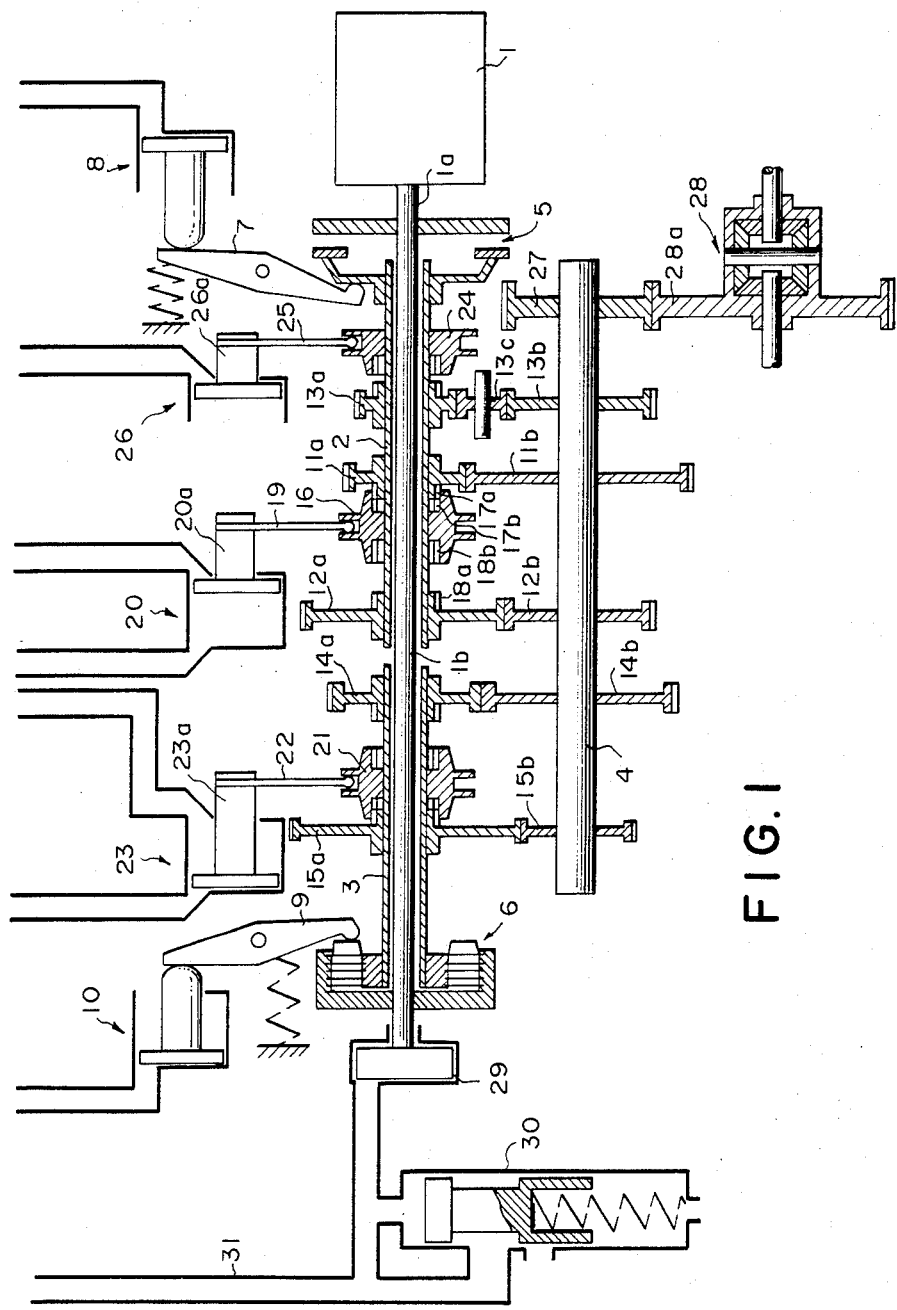
FIG. 1 is a diagrammatical view of a transmission in which the present invention can be embodied.

Referring to the drawings, particularly to FIG. 1, there is shown an engine 1 having a crankshaft 1a which is provided with a coaxially extending output shaft 1b. On the output shaft 1b, there are rotatably mounted a first input shaft 2 and a second input shaft 3 and a transmission output shaft 4 is provided in parallel with the input shafts 2 and 3. A first clutch 5 is provided for connecting one end of the first input shaft 2 with the engine output shaft 1b. At the opposite end, the second input shaft 3 is provided with a second clutch 6 for connecting the shaft 3 with the engine output shaft 1b. It is preferable that the first clutch 5 be of a dry disc type which has a large torque transmitting capacity. The clutch 5 is associated with a clutch actuating lever 7 for controlling the operation of the clutch 5. A first clutch actuator 8 is provided for actuating the clutch actuating lever 7 when a hydraulic pressure is applied thereto to thereby engage the clutch 5. The second clutch 6 may be of a relatively compact wet type and is associated with a second clutch actuating lever 9. A second clutch actuator 10 of hydraulic type is provided to actuate the lever 9 when hydraulic pressure is applied thereto so as to make the second clutch 6 engage.

The first input shaft 2 rotatably carries a first stage driving gear 11a and a third stage driving gear 12a which are in meshing engagement respectively with a first stage driven gear 11b and a third stage driven gear 12b provided on the output shaft 4. The first input shaft 2 further carries rotatably a reverse driving gear 13a which is engaged through a counter gear 13c with a reverse driven gear 13b provided on the output shaft 4. The second input shaft 3 rotatably carries a second stage driving gear 14a and a fourth stage driving gear 15a which are in meshing engagement respectively with a second stage driven gear 14b and a fourth stage driven gear 15b securely mounted on the output shaft 4.

On the first input shaft 2, there is provided a shifting hub 16 between the gears 11a and 12a. The hub 16 is splined to the first input shaft 2 so that the former rotates together with the latter but axially slidable with respect to the latter. The hub 16 is formed at the opposite end portions with teeth 17b and 18b, respectively, which are adapted to be brought into engagement respectively with gear teeth 17a and 18a formed on the gears 11a and 12a. It will therefore be understood that by moving the hub 16 along the first input shaft 2 in the axial direction it is possible to bring one of the gears 11a and 12a into engagement with the first input shaft 2. In order to actuate the shifting hub 16, there is provided a shift fork 19 which is connected with a piston 20a of a first shifting cylinder 20. Similarly, the second input shaft 3 is provided between the gears 14a and 15a with a shifting hub 21 which is similar in structure to the shifting hub 16. The hub 21 is arranged so that it is actuated by a piston 23a of a second shifting cylinder 23 through a shift fork 22. On the first input shaft 2, there is also provided a shifting hub 24 for the reverse driving gear 13a. The hub 24 is arranged so that it is actuated by a piston 26a of a third shifting cylinder 26 through a shift fork 25.

The output shaft 4 has an output gear 27 which is secured thereto and in meshing engagement with an input gear 28a of a differential gear assembly 28. At the free end of the output shaft 1b, there is provided an oil pump 29 which supplies a pressurized hydraulic oil through a pressure regulator 30 to a hydraulic pressure line 31.

Figure 2:
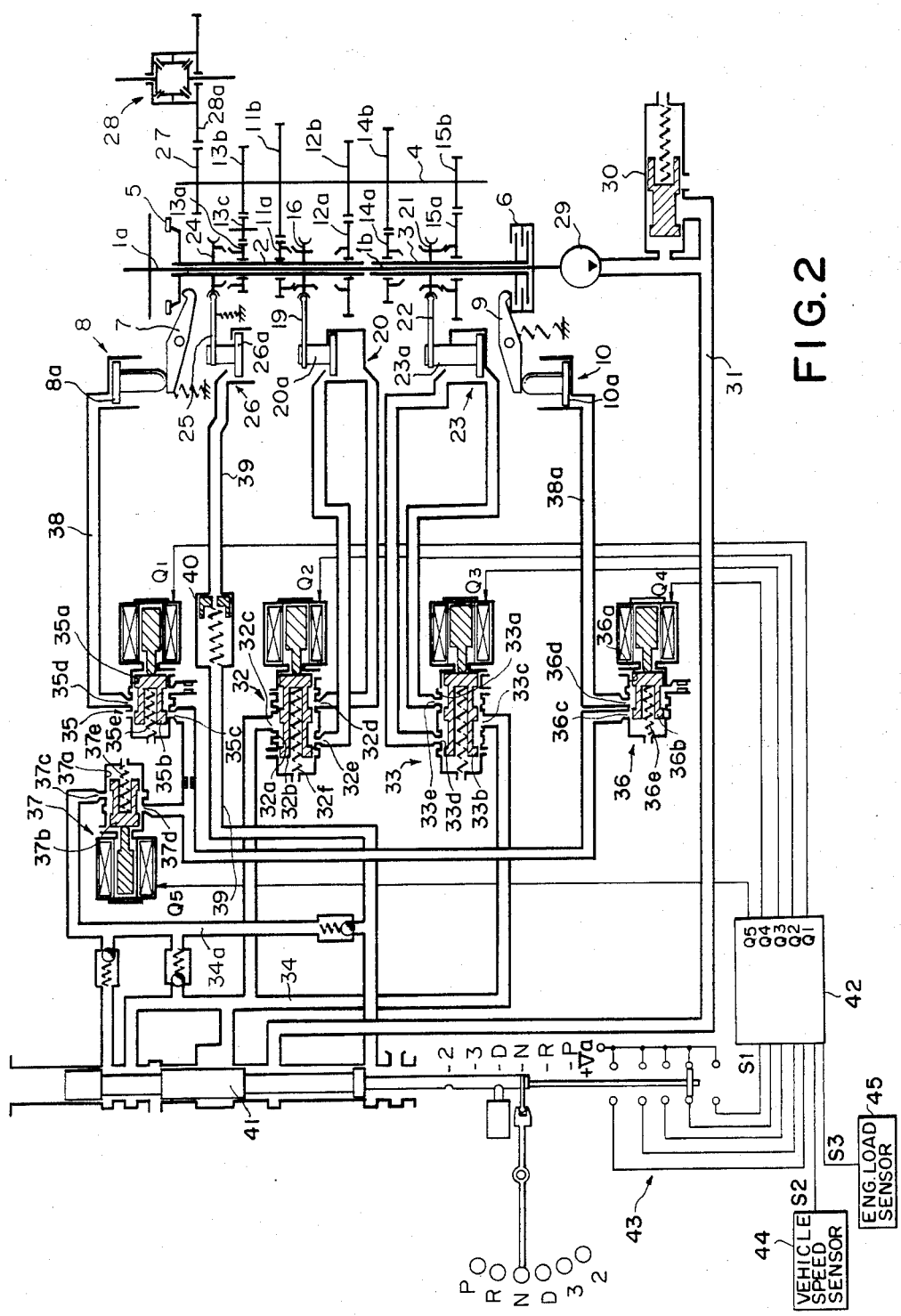
FIG. 2 is a diagram showing the hydraulic control circuit adopted in the transmission shown in FIG. 1.

Referring now to FIG. 2, it will be noted that the hydraulic control circuit shown therein includes a first shifting solenoid valve 32 for controlling the hydraulic pressure to the first shifting cylinder 20 and a second shifting solenoid valve 33 for controlling the hydraulic pressure to the second shifting cylinder 23. The first shifting solenoid valve 32 includes a valve bore 32a and a plunger 32b which is received in the valve bore 32a for axial sliding movement. The valve bore 32a is formed at an intermediate portion with a port 32c which is connected with a forward pressure line 34. At the opposite sides of the port 32c, there are formed ports 32d and 32e which are respectively connected with the opposite ends of the cylinder 20. The plunger 32b functions to alternately connect the port 32c to the port 32d or 32e when it is axially shifted. The plunger 32b is axially biased by means of a spring 32f and when it is axially shifted under the influence of the spring 32f, the port 32c is connected with the port 32d so that the piston 20a in the cylinder 20 is forced to a position wherein the first driving gear 11a is connected with the first input shaft 2. When the solenoid valve 32 is engaged, the plunger 32b is shifted against the force of the spring 32f so that the port 32c is connected with the port 32e. In this position, the piston 20a is forced in the opposite direction to thereby connect the third driving gear 12a with the first input shaft 2.

The second shifting solenoid valve 33 is similar in construction with the first valve 32 so that corresponding parts are designated by adding the same suffix. When the valve 33 is de-energized, the port 33c is connected with the port 33d so that the fourth driving gear 15a is connected with the second input shaft 3. When the valve 33 is energized, however, the port 33c is connected with the port 33e so that the second driving gear 14a is connected with the second input shaft 3.

For the purpose of controlling the clutches 5 and 6, there are provided a first control solenoid valve 35 and a second control solenoid valve 36. The valve 35 includes a valve bore 35a and a plunger 35b which is received in the valve bore 35a for axial sliding movement. The valve bore 35a is formed with a port 35c leading to a cut valve 37 which functions as a pressure regulating valve. The details of the cut valve 37 will be described later. The valve bore 35a is further formed with a port 35d which is connected through a passage 38 with one end 8a of a first actuator 8 for actuating the first clutch 5. At one end of the plunger 35b, there is a spring 35e whicn forces the plunger 35b in one axial direction to disconnect the ports 35c and 35d from each other. When the valve 35 is energized, the plunger 35b is shifted against the action of the spring 35e so that the ports 35c and 35d are connected together.

The second control solenoid valve 36 is similar in construction to the first valve 35 so that corresponding parts are shown by adding the same suffix. The port 36c is connected with the cut valve 37 whereas the port 36d is connected through the passage 38a with one end 10a of a second actuator 10 for actuating the second clutch 6.

The cut valve 37 includes a valve bore 37a and a plunger 37b which is received in the valve bore 37a for axial sliding movement. The valve bore 37a is formed with a port 37c which is connected with a pressure line 34a leading from the pressure line 34. The valve bore 37a is further formed with a port 37d which is connected with the ports 35c and 36c of the solenoid valves 35 and 36. At one end of the plunger 37a, there is provided a spring 37e so that the plunger 37b is forced toward the other end to a position wherein the ports 37c and 37d are communicated with each other. When the cut valve 37 is energized, the plunger 37b is shifted under the force of the spring 37e so that the ports 37c and 37d are disconnected from each other.

The third shifting cylinder 26 for reverse control is connected with a reverse pressure line 39 which is provided with an orifice check valve 40. The valve 40 is closed for the liquid flow in the direction toward the cylinder 26 so that the liquid is allowed to pass to the cylinder 26 only through a restricting orifice but opened for the liquid flow in the opposite direction so that the liquid pressure in the cylinder can be rapidly released. The pressure line 31 from the oil pump 29 is connected through a shift valve 41 to the pressure line 34 and to another pressure line 39, so that the line 31 is connected with the line 34 when the shift valve 41 is in either of the positions D, 3 and 2 but with the line 39 when the shift valve 41 is in the position R.

There is also provided a control circuit 42 which may be a commercially available microprocessor. The control circuit 42 is arranged so as to receive a position signal S1 from a shift valve position sensor 43, a vehicle speed signal S2 from a vehicle speed sensor 44 and an engine load signal S3 from an engine load sensor 45. The control circuit 42 is programmed so that it produces and supplies to the solenoids in the valves 32, 33, 35, 36 and 37 energizing currents in accordance with the signals S1, S2 and S3 as shown in the flow charts in FIGS. 3 and 4.

Figure 3:
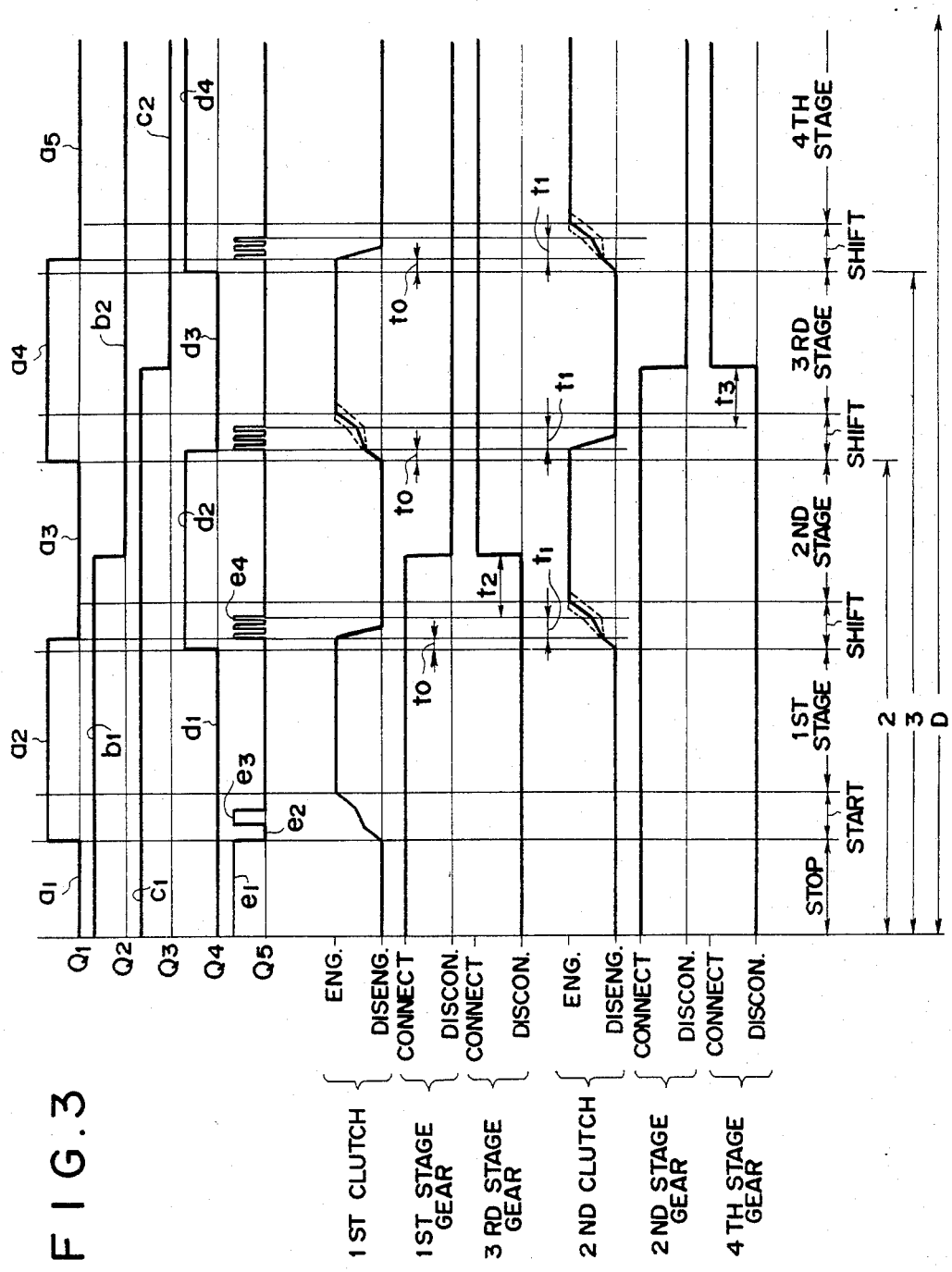
FIG. 3 is a chart showing gear shift up operations.

FIG. 3 shows gear shift-up operations in the transmission described above, and the currents to the first and second control valves 32 and 33 are designated by the reference Q2 and Q3, respectively, while the currents to the first and second shifting valves 35 and 36 by the reference Q1 and Q4, respectively. Further, the current to the cut valve 37 is shown by the reference Q5.

When the shift valve 41 is in one of the positions D, 2 and 3, the lines 34 and 34a are supplied with hydraulic pressure. If the vehicle is not running, however, the cut valve 37 is applied with the energizing current Q5 as shown by $e_1$ in FIG. 3 so that the valve 37 is closed. Therefore, there will be no hydraulic pressure in the passages to the solenoid valves 35 and 36. In this instance, no current is applied to the solenoid valve 35 as shown by $a_1$ in FIG. 3. Thus, the clutch actuator 8 is not applied with hydraulic pressure so that the first clutch 5 is disengaged. Similarly, the solenoid valve 36 is not supplied with energizing current Q4, either, as shown by $d_1$ so that the second clutch 6 is disengaged. The first shifting solenoid valve 32 is supplied with energizing current Q2 so that the first stage driving gear 11a is connected with the first input shaft 2. The second shifting solenoid valve 33 is supplied with energizing current Q3 so that the second stage driving gear 14a is connected with the second input shaft 3.

Figure 5:
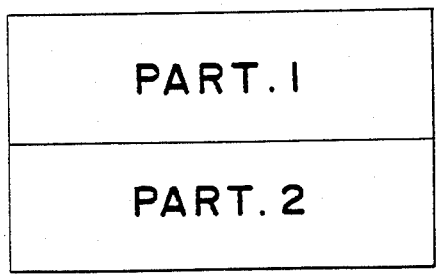
FIG. 5 is a flow chart generally showing the operation of the control circuit.

When the control circuit 42 is started to operate, the circuit 42 at first judges in the step 1 whether the vehicle is being started or not as shown in FIG. 5. If the vehicle speed is zero, the procedure is advanced to the step 2 wherein detection is made as to whether the shift valve 41 is in the position R. Where the shift valve 41 is in a position other than the position R, the first and second stage gears are connected with the first and second input shafts, respectively. Then, the position of the shift valve 41 is discriminated and where the shift valve is in either one of the positions D, 3 and 2, detection is made as to whether the engine throttle valve actuating pedal is depressed. If the pedal is depressed for vehicle start, the energizing current Q1 is applied to the solenoid valve 35 as shown by $a_2$ in FIG. 3, so that the ports 35c and 35d in the valve 35 are connected together. At the same time, the energizing current to the cut valve 37 is interrupted as shown by $e_2$ so that the line 34a is connected through the cut valve 37 and the solenoid valve 35 to the passage 38. Thus, the first clutch actuator 8 is applied with pressure at the side 8a so that it is moved to connect the first clutch 5.

During the connecting stroke of the first clutch 5, the cut valve 37 is momentarily supplied with energizing current Q5 as shown by $e_3$ in FIG. 3. Therefore, the increase in the pressure applied to the clutch actuator 8 is momentarily stopped so that the first clutch 5 is maintained in a half-connected condition. Thereafter, the current Q5 to the cut valve 37 is interrupted to allow the clutch actuator 8 to operate further so that the first clutch 5 is completely connected. With this clutch connecting operation, it is possible to start the vehicle smoothly. When the vehicle is running and the vehicle speed has decreased below a predetermined value, for example, 10 km/h, a stop signal is produced by the control circuit and the first and second clutches are disengaged as shown in FIG. 5.

For the purpose of gear shifting, discriminations and controls are performed in accordance with the positions of the shift valve as shown in FIG. 5. Where the shift valve 41 is in either of the positions D and 3, the gear shift control is performed in accordance with shift control maps which determines a desired gear stage under a specific vehicle speed and engine load. For example when the vehicle is running with the first stage gear, the energizing current Q4 is applied to the solenoid valve 36 as shown by $d_2$ in FIG. 3 when the vehicle reaches to a speed suitable for shifting to the second stage. Thus, the actuator 10 is applied with the hydraulic pressure to thereby engage the second clutch 6. The second clutch 6 is then moved with a first engaging speed. When a time period $t_0$ has passed after initiation of engaging movement of the second clutch 6, the cut valve 37 is applied with the pulsating energizing current Q5 for a period $t_1$ as shown by $e_4$. Thus, the hydraulic pressure from the cut valve 37 is decreased and the clutch engaging speed is therefore decreased. The time period $t_0$ may be determined by the time wherein the second clutch 6 is brought into a half-engaged condition and the engine is loaded through the clutch 6. Then, the time period $t_0$ may be increased in response to a decrease in the engine load. Alternatively, the time period $t_0$ may be determined by the time wherein the engine speed starts to fall when the second clutch 6 is being engaged. In this alternative method, referring to the flow chart in FIG. 6(a), "engine speed decrease" may be sensed in the steps 61 and 62 and if such engine speed decrease is detected the succeeding step may be carried out but if such engine speed decrease is not sensed the same procedure may be repeated. The engine speed may be calculated from the vehicle speed signal in accordance with the equation $$E_{sp} = K \times GR \times U_{sp}$$

wherein;
 $E_{sp}$ is the engine speed;
 GR is the gear ratio of the transmission;
 $U_{sp}$ is the vehicle speed;
 and K is the constant as determined by the wheel diameter, the final gear ratio, etc.

Figure 6A:
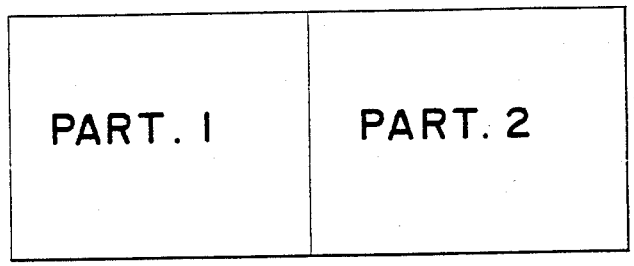
FIG. 6(a) is a sub-flow chart showing the gear shift up operations.

The second clutch actuator 10 is thus connected in the time period $t_1$ with a second engaging speed which is slower than the first engaging speed. As shown by dotted lines in FIG. 3, the second engaging speed may be changed so that it increases in response to an increase in the engine load. After the time period $t_0$ from the initiation of engaging movement of the second clutch 6 or, in other words, when the engaging speed of the second clutch 6 is changed from the first speed to the second speed, the energizing current Q1 to the solenoid valve 35 is interrupted as shown by $a_3$ so that the first clutch actuator 8 is opened to a drain port and the first clutch 5 is disengaged under the force of the associated spring. The disengagement of the first clutch 5 is carried out during the time period $t_1$ wherein the second clutch 6 is being engaged with the relatively slow second engaging speed. After the first clutch 5 is thus disengaged, or in other words, after the time period of $t_1$, the engaging speed of the second clutch 6 is increased to a third speed which may be the same as the first speed. In this manner, disengagement of the first clutch 5 and engagement of the second clutch 6 can be smoothly carried out. The flow chart of this control is shown in FIG. 6(a). By controlling the second engaging speed in accordance with the engine load as described above, it is possible to ensure a smoother shift up control. Under a relatively heavy load engine operation, there will be a relatively quick recovery of the engine speed when the first clutch 5 is disengaged so that the clutch engagement is carried out before such speed recovery takes place. However, under a light load operation, such speed recovery is relatively slow, so that the second clutch 6 is engaged slowly to avoid any possible shock.

When the vehicle is running with the second stage gear and the vehicle speed is increased to a suitable value, or when a time period $t_2$ has passed after the engaging speed of the second clutch 6 has been increased to the third speed, the energizing current Q2 to the solenoid valve 32 is interrupted as shown by $b_2$ in FIG. 3 to thereby connect the third stage driving gear 12a to the first input shaft 2. Then, in a similar manner, the second clutch 6 is disengaged by interrupting the current Q4 as shown by $d_3$ and the first clutch 5 is engaged by applying the current Q1 as shown by $a_4$ to the solenoid valve 35 to shift to the third stage gear. Further shifting from the third stage gear to the fourth stage gear can also be carried out in a similar manner by controlling the currents Q1, Q3 and Q4 as shown by $a_5$, $c_2$ and $d_4$. The clutch controls are carried out in a similar manner as described previously with respect to the shifting from the first stage to the second stage.

Figure 4:
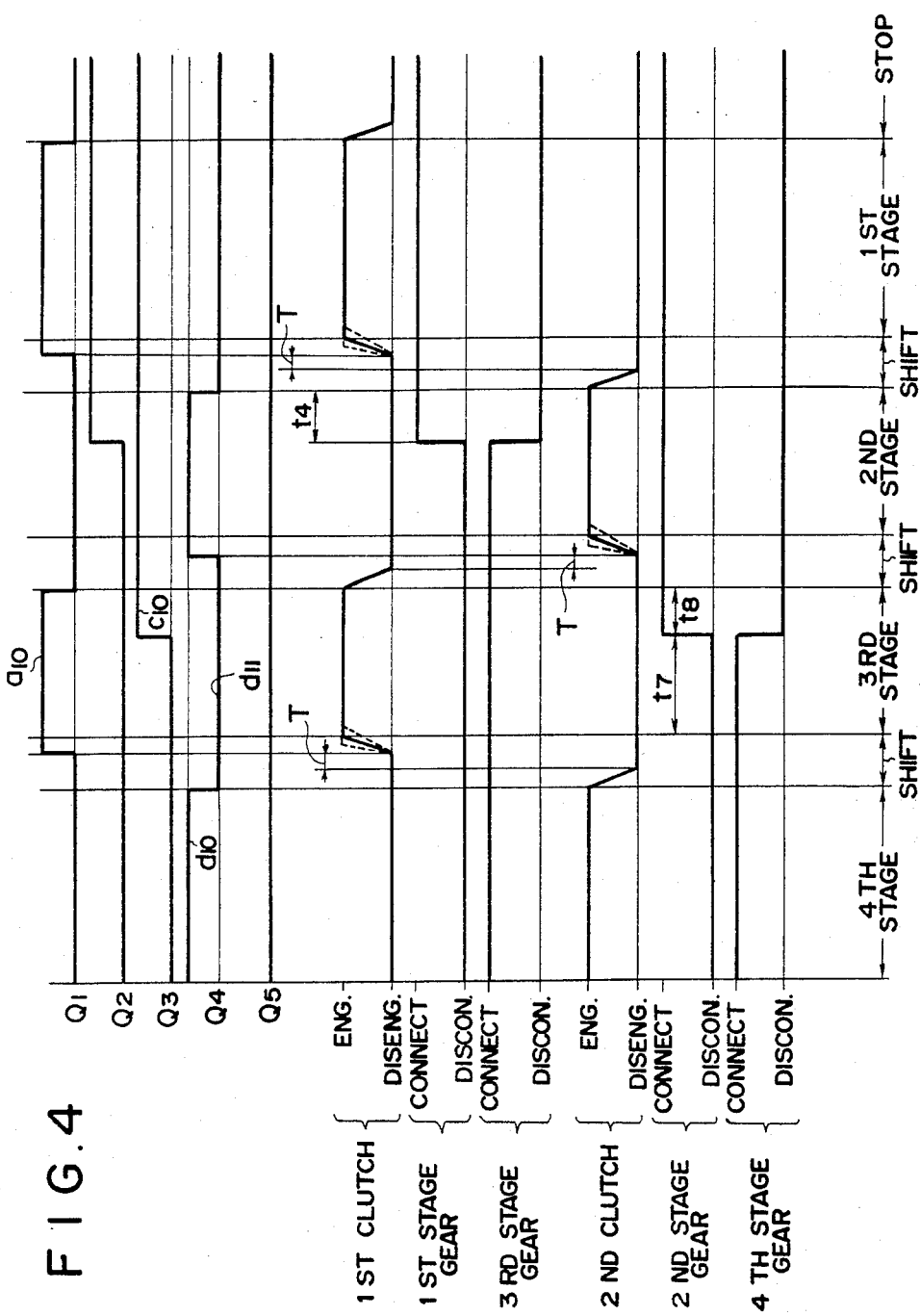
FIG. 4 is a chart showing gear shift down operations.

Shift down operations of the transmission will now be described with reference to FIGS. 4, 5 and 6(b). When the vehicle is running with the fourth stage gear, the solenoid valve 35 is not supplied with the energizing current Q1 as shown in FIG. 4, so that hydraulic pressure is not applied to the first clutch actuator 8. Thus, the first clutch 5 is disengaged. On the other hand, the solenoid valve 36 is supplied with the energizing current Q4 as shown by $d_{10}$ in FIG. 4 so that the second actuator 10 is supplied with hydraulic pressure and the second clutch 6 is therefore engaged. The first and second shifting solenoid valves 32 and 33 are energized by the currents Q2 and Q3 so that the third stage driving gear 12a is connected with the first input shaft 2 and the fourth driving gear 15a with the second input shaft 3.

Figure 6B:
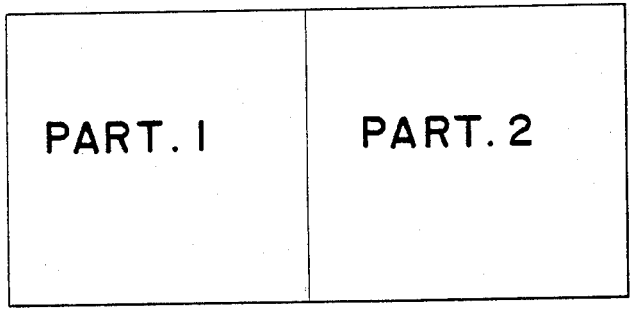
FIG. 6(b) is a sub-flow chart showing the gear shift down operations.

In shifting down from the fourth stage to the third stage, the control circuit 42 at first judges whether the shift down from the fourth stage to the third stage is to be made as shown in FIG. 6(b) and produces a second clutch disengage signal when such shift down is to be made. Thus, the energizing current Q4 to the solenoid valve 36 is interrupted as shown by $d_{11}$ in FIG. 4 so that the hydraulic pressure in the second clutch actuator 10 is exhausted to disengage the second clutch 6.

After the second clutch 6 is thus disengaged, the control circuit 42 judges whether the engine speed has increased by an amount corresponding to the difference in gear ratio between the fourth and third gear stages. When it is detected that such engine speed increase has been obtained, the control circuit 42 produces a first clutch engage signal. From the above, it will be understood that both the clutches 5 and 6 are simultaneously maintained in disengaged conditions for a time period T after the second clutch 6 is disengaged as shown in FIG. 4. During the time period T, the engine load is relieved so that the engine speed is smoothly increased.

As soon as the engine speed is increased to a predetermined value, the solenoid valve 35 is energized under the first clutch engage signal as shown by $a_{10}$ and the first clutch actuator 8 is applied with hydraulic pressure to connect the first clutch 5. The engaging speed of the first clutch may be changed in accordance with a change in the engine load as shown by dotted lines in FIG. 4 so that the engaging speed is increased in response to an increase in the engine load. In this manner, the disengagement of the second clutch 6 and the engagement of the first clutch 5 are carried out smoothly. The flow chart of this control procedure is shown in FIG. 6(b). The vehicle thus starts to run with the third stage gear and at a suitable instance, for example, after a lapse of time period $t_7$ from the completion of the gear shifting down, the energizing current Q3 is applied to the solenoid valve 33 as shown by $c_{10}$ to thereby connect the second stage driving gear 14a to the second input shaft 3. Thereafter, the first clutch 5 may be disconnected and the second clutch may be engaged to carry out the shifting down from the third stage to the second stage. Further shifting down can be performed in a similar manner. The clutch control timing is similar to that in the shifting down from the fourth stage to the third stage.

In the shifting down operation, if the engagement of the clutch is controlled only under the engine speed, problems may be encountered in that the engine speed does not recover to the predetermined value and the gear shifting down operation may not be completed. In order to avoid this problem, the clutch engagement may be carried out with a relatively slow engaging speed as shown by steps 63 through 65 in FIG. 6(b) after a lapse of time period $t_5$ or $t_9$ even though the engine speed is not increased to the predetermined value. Alternatively, in lieu of sensing the increase of the engine speed, a predetermined time period is in advance given as a time required for such engine speed increase and after a lapse of such time period the clutch engagement may be performed. For such control, the step 67 in FIG. 6(b) may be substituted by a step of judging whether a predetermined time has passed. The predetermined time should preferably be changed in accordance with the engine load in such a manner that the time period is decreased in accordance with an increase in the engine load. With this control, the steps 63 through 66 can be omitted. This alternative procedure can well be embodied by providing an appropriate program when a microprocessor is adopted as the control circuit 42.

The invention has thus been shown and described with reference to a specific embodiment, however, it should be noted that the invention is in no way limited to the details of the illustrated arrangement but changes and modifications may be made without departing from the scope of the appended claims.

We claim:

1. In a multiple clutch type transmission including a plurality of input shafts, a plurality of clutch devices for releasably and alternately connecting respective ones of said input shafts with an engine output shaft, each of said input shafts being associated with at least one set of transmission gears for connecting the input shaft associated therewith to an output element of the transmission, means for controlling said clutch devices so that a selected one of said input shafts is connected through a selected one of said clutch devices with the engine output shaft and through a selected set of said transmission gears with the output element, a method of controlling the clutch devices in a gear shift up operation, which comprises the steps of bringing one of the clutch devices which has not been in engagement into engagement with a first engaging speed for a first period of time while maintaining the other clutch device in engagement, then disconnecting the other clutch device which has been in engagement after a predetermined time so that there is a certain period of overlap wherein the one clutch device is in at least a substantially half-engaged condition while the other clutch device is still in engagement.

2. A method in accordance with claim 1 in which the engaging speed of said one clutch device is decreased at the end of the first period of time to a second engaging speed which is lower than the first engaging speed.

3. A method in accordance with claim 2 in which said second engaging speed is determined in accordance with engine load so that the second engaging speed is increased in response to an increase in the engine load.

4. A method in accordance with claim 1 in which said first period of time is determined in accordance with engine load so that the time is increased in response to a decrease in the engine load.

5. A method in accordance with claim 2 in which said clutch engaging speed is again increased from the second engaging speed to a third engaging speed which is higher than the second engaging speed after said other clutch device is completely disengaged.

6. A method in accordance with claim 5 in which said third engaging speed is the same as the first engaging speed.

7. A multiple clutch type transmission including a plurality of input shafts, a plurality of clutch devices respectively associated with said input shafts for releasably connecting associated ones of the input shafts with an engine output shaft, each of said input shafts being associated with at least one set of transmission gears for connecting the associated input shaft with an output element of the transmission, clutch controlling means for producing a first clutch engaging signal in a gear shift up operation for a first period of time to bring one of the clutch devices which has not been in engagement into engagement with a first engaging speed while the other clutch device is still in engagement so that the two clutch devices are maintained simultaneously in at least a substantially half-engaged condition, and then producing a clutch disengaging signal after a predetermined time to have the other clutch device disengaged.

8. A transmission in accordance with claim 7 in which said clutch controlling means includes means for producing a second clutch engaging signal simultaneously with said clutch disengage signal to thereby decrease the engaging speed of said one clutch device to a second engaging speed which is lower than the first engaging speed.

9. A transmission in accordance with claim 8 in which said second engaging speed is increased in response to an increase in engine load.

10. A transmission in accordance with claim 7 in which said controlling means includes means for changing said first period of time in response to an engine load so that the time period is decreased in response to an increase in the engine load.

11. A transmission in accordance with claim 8 in which said clutch controlling means includes means for producing a third clutch engaging signal after a second time period from issuance of the second clutch engaging signal to thereby increase the engaging speed of said one clutch device to a third engaging speed which is higher than the second engaging speed.

12. A transmission including a first input shaft adapted to be releasably connected with an engine output shaft through a first clutch device, a first transmission gear set associated with said first input shaft for connecting said first input shaft with an output element of the transmission, a second input shaft adapted to be releasably connected with the engine output shaft through a second clutch device, a second transmission gear set which is of a lower stage than said first transmission gear set and associated with said second input shaft for connecting said second input shaft with the output element, controlling means for producing, in an operating condition wherein said second clutch device is in engagement, a first clutch engaging signal to bring said first clutch device into engagement with a first engaging speed so that the first clutch device is brought into at least a substantially half-engaged condition while the second clutch device is still engaged, then producing a clutch disengaging signal after a predetermined time for disengaging the second clutch device, as well as a second clutch engaging signal to bring the first clutch device into engagement with a second engaging speed which is lower than the first engaging speed, and thereafter producing a third engaging signal for bringing the first clutch device into engagement with a third engaging speed which is higher than the second engaging speed.

* * * * *